US012363109B2

(12) United States Patent
Gadwale

(10) Patent No.: US 12,363,109 B2
(45) Date of Patent: Jul. 15, 2025

(54) CALLER AND RECIPIENT ALTERNATE CHANNEL IDENTITY CONFIRMATION

(71) Applicant: Capital One Services, LLC, McLean, VA (US)

(72) Inventor: Adithya Gadwale, Falls Church, VA (US)

(73) Assignee: Capital One Services, LLC., McLean, VA (US)

( * ) Notice: Subject to any disclaimer, the term of this patent is extended or adjusted under 35 U.S.C. 154(b) by 0 days.

(21) Appl. No.: 18/394,363

(22) Filed: Dec. 22, 2023

(65) Prior Publication Data

US 2024/0348602 A1 Oct. 17, 2024

Related U.S. Application Data

(63) Continuation of application No. 17/345,536, filed on Jun. 11, 2021, now Pat. No. 11,855,982, which is a continuation of application No. 16/843,251, filed on Apr. 8, 2020, now Pat. No. 11,063,938, which is a continuation of application No. 16/570,796, filed on Sep. 13, 2019, now Pat. No. 10,659,459.

(51) Int. Cl.
*H04W 12/00* (2021.01)
*H04L 9/40* (2022.01)
*H04L 67/55* (2022.01)
*H04M 3/51* (2006.01)
*H04W 12/06* (2021.01)
*H04W 84/04* (2009.01)

(52) U.S. Cl.
CPC ...... *H04L 63/0861* (2013.01); *H04L 63/0853* (2013.01); *H04L 67/55* (2022.05); *H04M 3/51* (2013.01); *H04W 12/06* (2013.01); *H04W 84/042* (2013.01)

(58) Field of Classification Search
CPC . H04L 63/0861; H04L 63/0853; H04L 67/55; H04M 3/51; H04W 12/06
See application file for complete search history.

(56) References Cited

U.S. PATENT DOCUMENTS

| | | | |
|---|---|---|---|
| 10,659,459 B1 * | 5/2020 | Gadwale | G06F 21/34 |
| 11,063,938 B2 * | 7/2021 | Gadwale | H04W 12/06 |
| 11,855,982 B2 * | 12/2023 | Gadwale | H04W 12/06 |
| 2017/0346948 A1 * | 11/2017 | Wolf | H04M 3/5238 |

* cited by examiner

*Primary Examiner* — Erika A Washington
(74) *Attorney, Agent, or Firm* — KDW FIRM PLLC

(57) ABSTRACT

A system and method are disclosed that leverage multi-factor authentication features of a service provider and intelligent call routing to increase security and efficiency at a customer call center. Pre-authentication of customer support requests reduces the potential for misappropriation of sensitive customer data during call handling. A contactless card uniquely associated with a client may provide a second factor of authentication to reduce the potential for malicious third-party impersonation of the client. Pre-authorized customer support calls are intelligently and efficiently routed in a manner that reduces the opportunity for malicious call interference and information theft.

20 Claims, 6 Drawing Sheets

CALLER AND RECIPIENT ALTERNATE CHANNEL IDENTITY CONFIRMATION

CROSS-REFERENCE TO RELATED APPLICATIONS

This application is a continuation of U.S. patent application Ser. No. 17/345,536, filed Jun. 11, 2021 (now U.S. Pat. No. 11,855,982), which is a continuation of U.S. patent application Ser. No. 16/843,251, filed Apr. 8, 2020 (now U.S. Pat. No. 11,063,938) which is a continuation of U.S. patent application Ser. No. 16/570,796, entitled "CALLER AND RECIPIENT ALTERNATE CHANNEL IDENTITY CONFIRMATION" filed on Sep. 13, 2019 (now U.S. Pat. No. 10,659,459). The contents of the aforementioned application are incorporated herein by reference in their entirety.

BACKGROUND

Call center services are typically provided by service providers to enable clients to access, modify, delete or otherwise manage their accounts. For security purposes and to otherwise support accounts, call centers may store sensitive customer information, such as social security numbers, account numbers, account balances, email addresses, phone numbers, postal addresses and the like. Thus, call centers, and particularly the communications between call centers and customers, are frequently the targets of third parties who seek to access the sensitive customer information for identity theft and other malicious purposes.

To overcome this problem, customers may have to prove their identity to a call center, for example, by providing their sensitive information to the call center for validation purposes. Such practices are known in the industry, and consumers expect to provide such sensitive information to call centers. As such, an understanding has evolved between call centers and consumers whereby the consumer trusts that the call center is authorized to receive such information, and that the transmission of such information is secure.

A problem arises when third parties, understanding this dynamic, pose as call center agents and contact consumers, soliciting sensitive information as part of a fraudulent authentication process. For example, a malicious third party may contact a consumer, posing as a service provider representative, and describe an issue with their account that requires action; as a prelude to performing the action, the imposter may request sensitive information under the pretense of validating the consumer. Unfortunately, once the third party has obtained the sensitive information, the consumers accounts are at risk. It would be desirable to minimize the exposure of consumers to losses associated with such practices.

SUMMARY

According to one aspect, a method for authenticating a communication between a client and a service provider includes the steps of receiving, over a voice communication channel by a client device, a first service provider communication from the service provider. The method further includes receiving, over a application communication channel by the client device an authentication of the first service provider communication and a request seeking an authentication response including a biometric input or an ownership input from the client. The method also includes receiving, at a client interface of the client device, the authentication response and forwarding the authentication response to the service provider over the application communication channel. Other embodiments of this aspect include corresponding computer systems, apparatus, and computer programs recorded on one or more computer storage devices, each configured to perform the actions of the methods.

According to another aspect, a device disclosed herein may include a processor, a voice communication interface, a application communication interface and a user interface configured to exchange information with a client. The device may further include a non-volatile storage device including program code stored thereon, where the program code may be operable when executed upon by the processor to display, on the user interface, a validation of a first service provider communication received at the voice communication interface, the validation received over the application communication interface of the device as a second service provider communication. The program code may be further operable when executed upon to display, on the user interface, a client authentication request. The device may forward a client authentication response received at the user interface from a service provider over the application communication interface, the client authentication response including at least one of a biometric input or ownership input received at the user interface from the client. Other embodiments of this aspect include corresponding computer systems, apparatus, and computer programs recorded on one or more computer storage devices, each configured to perform the actions of the methods.

One general aspect includes a method for authenticating a communication between a client and a service provider includes the steps of: initiating a voice communication to a client device by the service provider over a voice communication channel. The method also includes initiating a application communication by the service provider to the client device over a application communication channel, the application communication including a notification of the voice communication. The method also includes the application communication requesting an authentication response from the client associated with the client device, the authentication response including a biometric input or a knowledge input from the client. The method also includes receiving the authentication response by the service provider over the application communication channel. The method also includes selectively terminating the voice communication over the voice communication channel responsive to the authentication response. Other embodiments of this aspect include corresponding computer systems, apparatus, and computer programs recorded on one or more computer storage devices, each configured to perform the actions of the methods.

DETAILED DESCRIPTION

Figure 1:
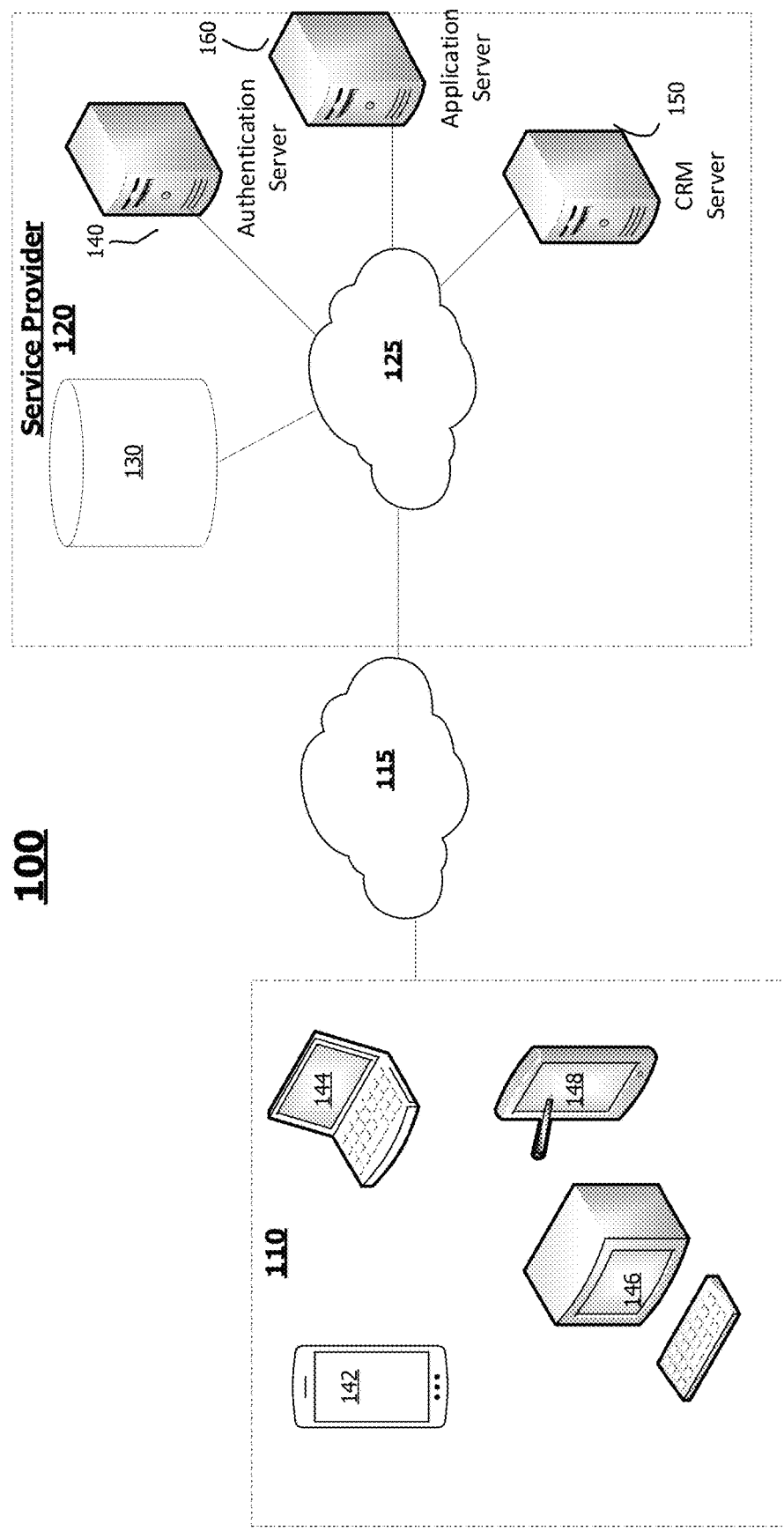
FIG. 1 is a block diagram of one embodiment of a data transmission system configured to authenticate call center validation requests as disclosed herein.

A multi-channel communication system and protocol are provided to improve the security of client/call center interactions. In one embodiment, a client may be notified over a trusted communication channel of the validity of a first service provider communication that has been received or is to be received over a first communication channel. The first communication may relate to an application service provided to the client by the service provider. The trusted communication channel may be a secure session established between the application service provided by the service provider and the client device. For example, in some embodiments, the trusted communication includes a second communication, including a PUSH notification forwarded by the application service to the client device. Validating the service provider communication over a trusted channel may increase client confidence in the authenticity of the service provider communication. Protocols that restrict disclosure of sensitive customer information over a first communication channel pending receipt of validation over the second, secure channel improve the security of client/server communications by reducing the risk of exposure to and/or exchange of sensitive customer information.

In some embodiments, security may further be improved by additionally authenticating the client to the service provider, for example, by requesting an authentication response from the client by the service provider. In some embodiments, the authentication response may establish a client identity, a client knowledge and/or a client ownership. The authentication response may be forwarded to the service provider over the trusted communication channel. The first communication may be selectively terminated in response to the authentication response, for example, if the authentication response is incorrect.

In some embodiments, security may further be improved by providing, with the authentication response, a keyword over the second communication channel. The keyword may subsequently be returned to the client over the first communication channel. Such an arrangement validates the authenticity of both the client device and the service provider, increasing the security of the client/server communications and reducing the opportunity for malicious interference and identity theft.

These and other features of the invention will now be described with reference to the figures, wherein like reference numerals are used to refer to like elements throughout.

As used in this application, the terms "system", "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

FIG. 1 illustrates a system 100 including one or more client devices 110 coupled to a service provider 120 via a network 115. According to one aspect, the client devices 110 comprise network-enabled computers and communicate with the service provider 120 via networks 115 and 125 to access service provider content and services.

As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client device, a fat client device, an Internet browser, or other device.

The client devices 110 thus can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

One or more client devices 110 also may be a mobile device for example, such as an iPhone, iPod, iPad from Apple® or any other mobile device running Apple's iOS operating system, any device running Microsoft's Windows® Mobile operating system, and/or any other smartphone or like wearable mobile device.

Various client devices 110 of FIG. 1 include a cellular phone 142, a laptop 144, a tablet 148 and a terminal 146. Client devices 110 may include a thin client application specifically adapted for communication with the service provider 120. The thin client application may be stored in a memory of the client device and be operable when executed upon by the client device to control an interface between the client device and a service provider application, permitting a user at the client device to access service provider content and services.

In some examples, network 115 may be one or more of a wireless network, a wired network or any combination of wireless network and wired network and may be configured to connect client device 110 to service provider 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network ("WAN"), a wireless personal area network ("WPAN"), a local area network ("LAN"), or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices.

It should be appreciated that according to one or more examples, network 115 may be part of a plurality of interconnected networks, such as, for example, the Internet, a service provider's private network 125, a cable television network, corporate networks, such as credit card association networks, and home networks. In addition, private network 125 may be implemented as a virtual private network layered upon network 115.

Service provider 120 is, in one embodiment, a business providing computer-based services to clients over a network 115. Almost all modern service providers use the internet to provide service offerings to potential consumers. The service offerings are generally provided in the form of software applications which operate using dedicated resources of the service provider. The combination of the software and hardware that provides a particular service to a client is referred to herein as a 'server.' For example, application server 160 may provide one or more services to clients of the service provider 120. The servers may communicate over a private network 125 of the service provider, often referred to as a corporate or enterprise network. The private network 125 may comprise a wireless network, a wired network, or any combination of wireless network and wired network as described above with regard to network 115.

In some embodiments, service providers may share services among different applications and may have dedicated servers to support the tasks of shared services. Examples of such servers include an authentication server 140 and a Customer Relationship Manager (CRM) server 150. In some embodiments, the authentication server 140 may manage a client's access to data and services of the service provider 120, for example, by validating user credentials and access privileges. The authentication server 140 may store information related to clients in tables, either locally on the server 140, or in a remote storage device 130. The storage device 130 may be comprised of coupled data resources comprising any combination of local storage, distributed data center storage, or cloud-based storage.

A CRM server 150 may manage on line and in person support for the various application services provided by the service provider 120. For example, a CRM server 150 may manage a call center that a client may contact to add or manage services provided by the service provider. In some embodiments, the CRM server 150 may utilize the authentication server 140, for example, to validate user credential before exchanging sensitive information with a client. In some embodiments, a call center agent may interact with the CRM server 150 via a workstation 145 or similar device. The call center agent may be forwarded client contact information, for example, to contact a client that has registered an issue or requested information related to a service provider application.

Often the interaction between the CRM involves the exchange of sensitive customer information such as a password, social security number, keyword or another token that is used by the call center agent to validate the identity of a client. According to one aspect, a CRM 150 may be configured as disclosed herein to validate the call center agent as a true service provider representative, thereby validating the origin of the service provide communication and increasing client trust in the security provided by the service provider. In one embodiment, the CRM 150 may be configured to communicate with a client device over a trusted channel separate from a call center channel (e.g. voice communication channel), where the communication over the trusted channel provides notification to the client about the validity of the origin or source of the voice communication. Such an arrangement may be useful to validate solicited and/or unsolicited service provider calls and provide comfort to the client that the person at the other end of the phone is a trusted call center agent.

Figure 2:
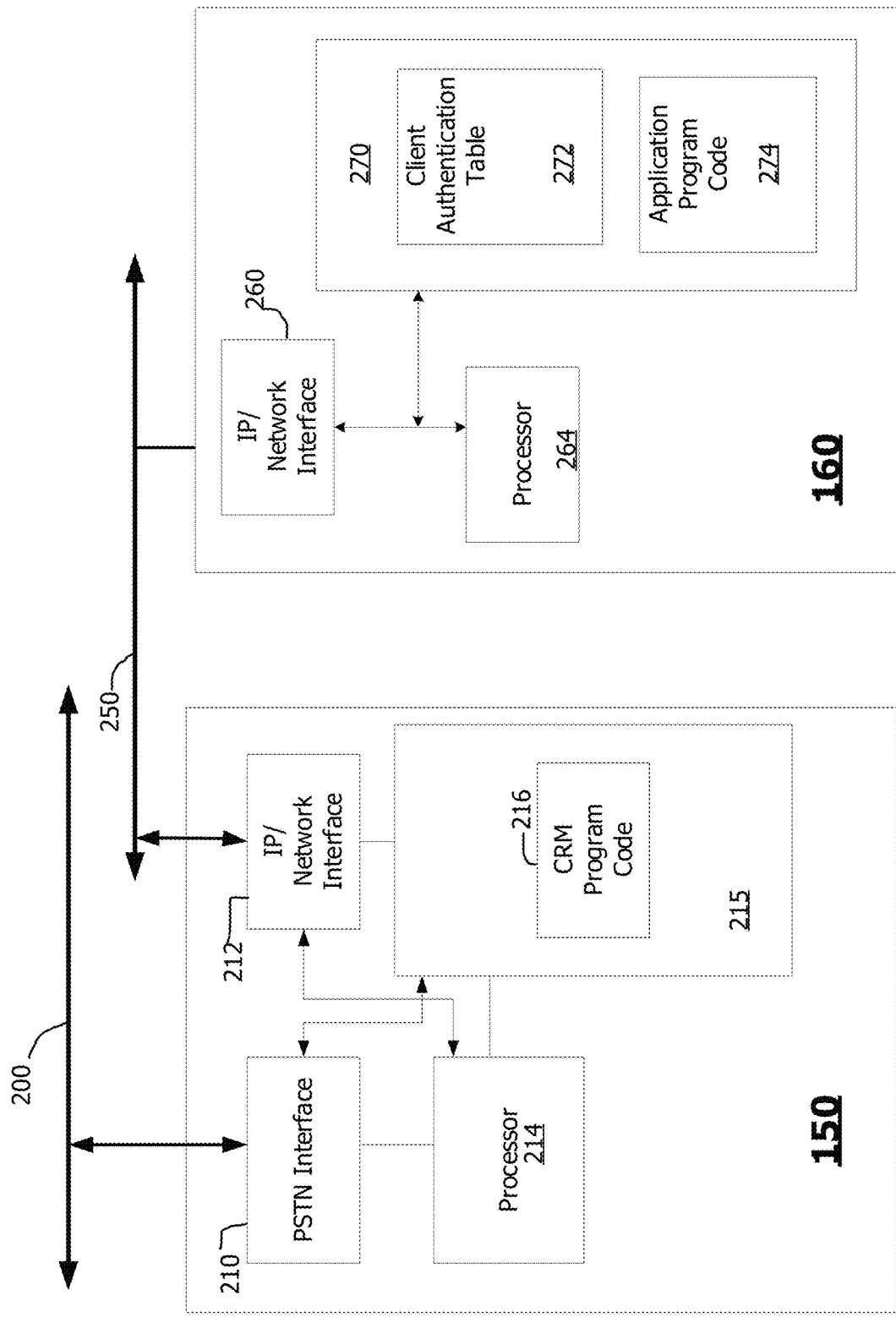
FIG. 2 is a block diagram of exemplary components that may be included in embodiments of the servers of the system of FIG. 1.

FIG. 2 is a block diagram illustrating exemplary components of a system including a CRM server 150 and an application server 160. The CRM server 150 is shown to include a Public Switched Telephone Network (PSTN) interface 210, an Internet Protocol Network interface 212, a processor 214 and a memory 215. The memory 215 may store CRM program code 216 operable when executed upon by the processor 214 to perform a method of validating call center/client communications as disclosed herein.

The application server 160 includes an IP network interface 260, a processor 264 and a memory 270. In one embodiment, the application server 160 may store a client authentication table 272. The client authentication table 272 may store user credential, access privileges and other security information for clients, including but not limited to account names, account numbers, user names, passwords, tax id numbers, query/response pairs, biometric information, etc. In other embodiments, the application server 160 may communicate with an authentication server to validate client requests as described herein.

The application server 160 may also include application program code 274 which enables a client to access a service of the service provider. For example, the application program code may host or otherwise manage a customer facing web application through which the client is able to access and/or manage their account.

FIG. 2 illustrates two communication channels. Communication channel 200 may be, for example, a Public Switched Telephone Network (PSTN), cellular network or combination thereof that supports voice calls between individuals.

Communication channel 250 may be a wireless or wireline network, or a combination thereof, which supports Internet Protocol (IP) communications between software applications, for example, software applications running on the application server 160, CRM 150 and/or one or more client devices 110 (FIG. 1)

According to one aspect, a communication initiated by the CRM 150 over communication link 200 to a client device is validated by the CRM server 150 through a second, trusted communication channel. For example, concurrently with, substantially concurrently with, prior to or after the initiation of a phone call by the CRM to the client, the CRM may request the application server to PUSH or otherwise transmit a notification to the client over a communication channel 250, for example as part of a secure session established between the application server 160 and the client 110. With such an arrangement, the client receives contemporaneous dual channel validation to establish the authenticity of the call.

In some embodiments, the application server 160 may also forward a request to the client over the channel, the request seeking authentication data from the client. In some embodiments, the authentication data may include a password, biometric input, fob number, card number, query response, etc. The application server may compare received authentication data against information for the client that is stored in the client authentication table 272 and communicate the validation of the client to the CRM 150. In some embodiments, the CRM 150 may use the validation of the client as a prerequisite to serving the client.

Figure 3:
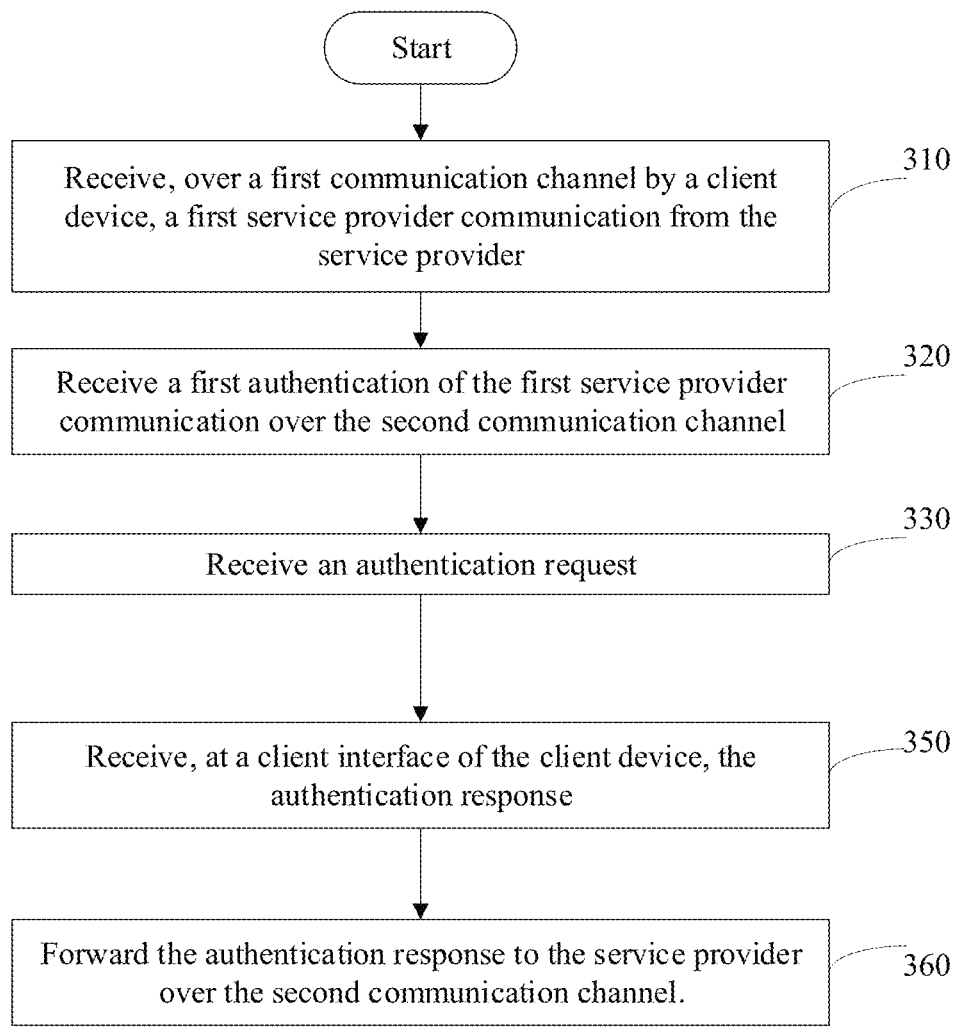
FIG. 3 is a flow diagram illustrating exemplary steps that may be performed by a client device to authenticate a call center communication according to an embodiment disclosed herein.

Referring now to FIG. 3, an exemplary process 300 that may be performed by a client device interacting with a CRM to validate client/call agent communications is shown. At step 310, the client may receive, over a first communication channel by a client device, a first service provider communication from the service provider. For example, this communication may include a call from a service provider call center. The call may be made to the client in response to a call request input by the client, or due to a call trigger condition being experienced by the service provider. For example, the call trigger condition may be that unusual activity has occurred on a client account. At step 320, the client also receives a second communication over a second communication channel. In some embodiments, the second communication is a trusted communication channel between an application service of the service provider and the client. The trusted communication channel may be a session established between the client and the service provider. The second communication may be forwarded by the application server to the client as a PUSH command that includes a prompt or other notice of an impending call from the service provider.

In one embodiment, at step 330, the client device further receives a request for authentication data. The request for authentication data may seek information such as a password, query response, biometric input, etc. The biometric input includes one or more of a facial feature, a fingerprint, a hand geometry, an iris scan, a retinal scan, a blood pressure scan or a voice scan. The input may be provided via an interface of the client device, such as a scanner, a camera, a keypad, touchpad, microphone, etc. At step 350, the client device receives the authentication response via the user interface, and at step 360 forwards the response to the CRM server using the second communication channel.

With such an arrangement, the call center agent is authenticated to the client, and the client is authenticated to the call center agent. In various embodiments, should the client fail to receive the validation notification, or the client fails to provide the appropriate authentication response, the call may be terminated. In one embodiment, along with the authentication response, the client may further forward a keyword or voice clip, that may be repeated or replayed to the client at the start of the call to further assure the client of the securing of the call exchange.

Figure 4:
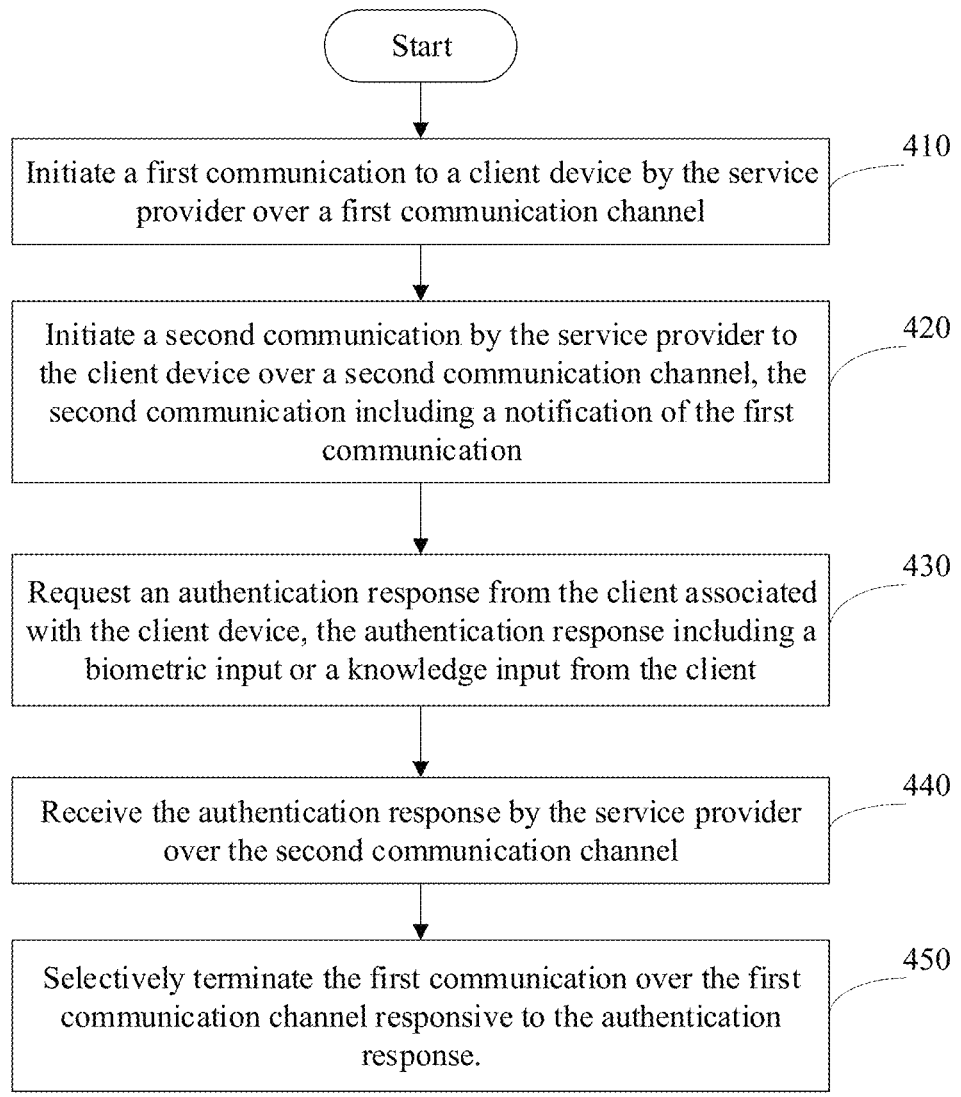
FIG. 4 is a flow diagram illustrating exemplary steps that may be performed by a service provider to validate call center communications according to an embodiment disclosed herein.

FIG. 4 illustrates various steps of a process 400 that may be performed by the CRM 150 for authenticating communication between a client and a service provider. At step 410, the call center agent initiates the first communication to a client device by the service provider over a first communication channel. For example, the call center agent may click on a phone number of the client presented to the call center agent on a CRM application interface to initiate a call with the client. Initiating the call sets up the first communication link over the cellular/PSTN network.

At step 420, The method also includes initiating a second communication by the service provider to the client device over a second communication channel, the second communication, including notification of the first communication. Receipt of the second communication validates the first communication, thereby increasing the trust of the user in the security of any exchange of sensitive information.

At step 430, in one embodiment the method includes requesting an authentication response from the client associated with the client device, the authentication response including a biometric input or a knowledge input from the client At step 440, the service provider receives the authentication response from the client and compares the authentication response against an expected authentication response for the client. In the event of a match, the call agent may continue the call. In the event of a mismatch between the client response and the expected response, at step 450 the call agent may terminate the call or forward the call for remediation. In some embodiments, the client may gain further assurances about the security of the link by providing, with the authentication response over the second communication channel, a keyword, voice clip, image or other input which may be played back to the client by the call agent via the first communication link.

Figure 5A:
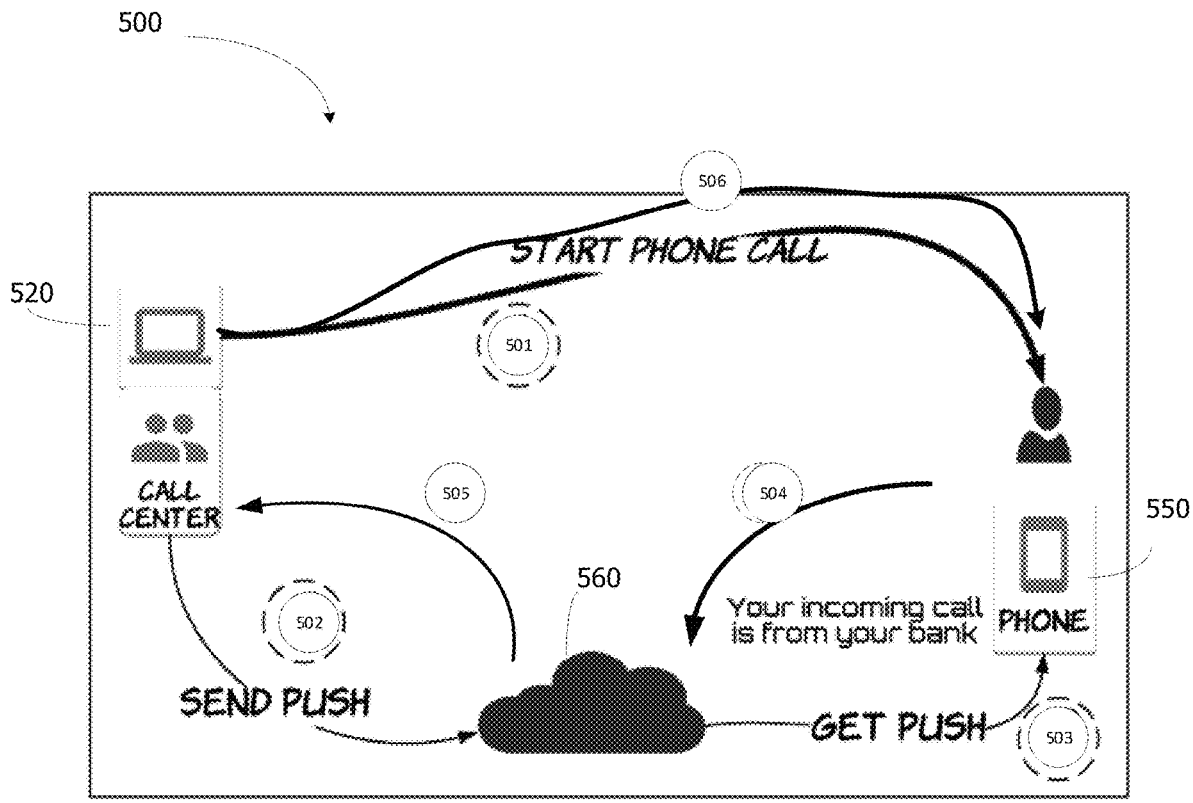
FIG. 5A is a data flow diagram provided to describe interactions between a client device and a service provider for validating call center communications according to one embodiment disclosed herein.

FIG. 5A is a dataflow diagram provided to illustrate one embodiment of a client/call center authentication process 500 that provides improved security for client information. At step 501 the call center 520 initiates a call via a first communication channel to the client device 550. As mentioned previously, the first communication channel may use a cellular network, telephony network, an IP network or any network capable of supporting bilateral communication between the client and the call center. Although the first communication link may support voice communications, it is appreciated that bilateral communication links such as chat sessions are within the scope of this disclosure.

At step 502, the call center 520 further initiates a second communication to the client device 550, for example by instructing a trusted application service to PUSH a notification of the impending call issued at step 501 to the client device 550. When at step 502 an agent at the call center 520 initiates the notification process, the agent sends a PUSH request to a separate application service 560. In embodiments such as FIG. 5A, the application service 560 may be or may use a cloud based service, where a cloud based service uses applications, services or resources made available to users on demand through shared resources of a cloud based service provider. In some embodiments, the application service is a service provided by the service provider for managing the account related to the service provider communication. For example, the application service may be an account management service of the service provider. At step 503, the application service issues the requested PUSH to the client device.

Figure 5B:
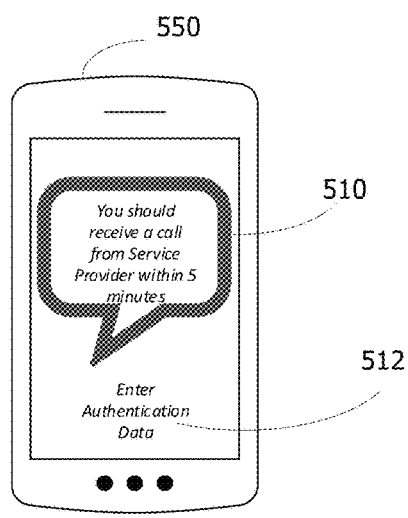
FIG. 5B illustrates exemplary notification provided on a user interface of a client device supporting the methods disclosed herein.

FIG. 5B illustrates one example of a user interface of a device 550 configured to display a validation notification such as notification 510 that has been pushed over the second communication channel to the client The notification may be, for example, a notification of an impending call and/or a validation of an existing call connection. In the example of a notification of an existing call, the notification may relate to a new client/call center interaction, for example on initiated by the call center but received after the call has been received by the call center. In some embodiments, the call center may send such notification to the client at any point during a communication when the client requests further authenticity of the call center agent.

In the example of FIG. 5B, the validation notification provides assurances to the client that an incoming communication is from their service provider. For example, the notification of FIG. 5B that 'You should receive a call from your service provider within 5 minutes' establishes authenticity of the incoming call.

In some embodiments, the pushed notification may further include an authentication request. The authentication request may be useful in ensuring that the client that possesses the client device that is being used to establish the communication link with the call center is authorized to discuss the client account with the service provider. As shown in FIG. 5B, the authentication request may be provided as a prompt 512 on the user interface of the client device 550.

In some embodiments, the authentication request may seek information establishing one or more of knowledge, ownership and/or identity. Knowledge may be established through the use of passwords, query responses or known client quantities, such as last transaction values, account numbers, tax identification numbers, etc. Ownership may be established by the client providing a token from a possessed item, such as a card or key fob. Identity may be gleaned by scanning biometric scans such as fingerprint scans, iris scan, facial scans, etc.

In some embodiments, the user interface may also include an option enabling the user to return a voice clip, keyword or other session validating information to the call center agent over the second channel. The session validating information may be played back or otherwise presented to the client as part of the first communication. The session validation information helps to validate the connection between the second communication channel and the first communication channel to the client, thereby increasing client confidence in the call center. In some embodiments, the option may be provided as button or link that is presented on the user interface which, when selected, permits the client to enter the session validating information.

Returning again to FIG. 5A, at step 504 the response is returned to the application service 560. In some embodiments, the application service 560 may perform validation of the authentication response. In other embodiments, the application service 560 may communicate with an authentication service which stores client authentication information. Whichever entity manages authentication, at step 505 the application service forwards the authentication result to the call center 520. In embodiments where the user has also forwarded session validating information (such as a voice clip or keyword), the session validating information may be further forwarded to the call center.

In the event that the authorization response validates the client, at step 506, the call center may communicate, over the first communication link, that appropriate authentication responses have been received, and may begin management of the customer issue that originated the call. In some embodiments, the call center may also play, display otherwise communicate the session validating information to the client, providing client confidence in the validity and relationship between the first and second communication pathways.

Accordingly, a system and method for increasing the trust and security for call center/client has been shown and described. The method includes various steps in a process which may be implemented in hardware, software or a combination thereof.

Figure 6:
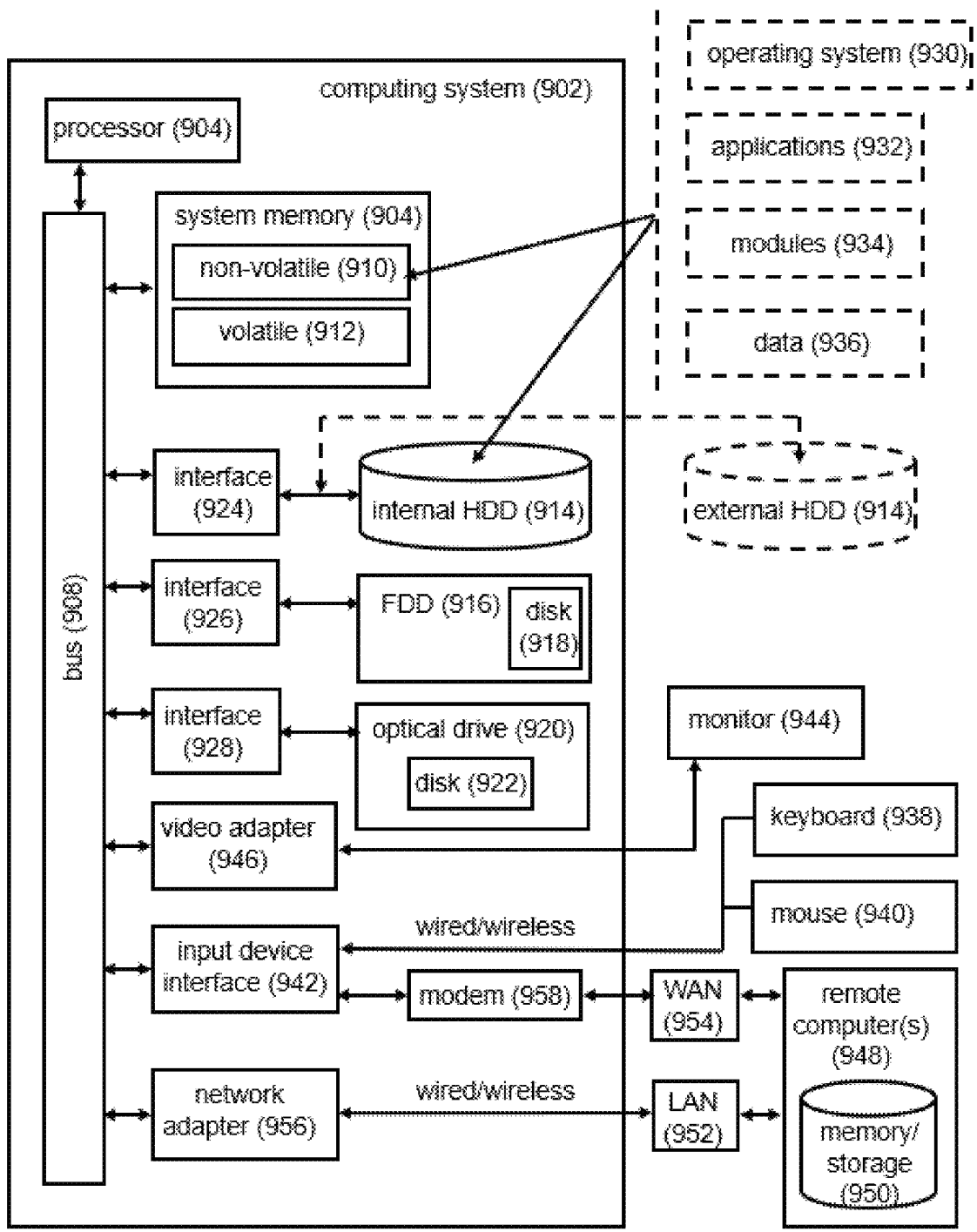
FIG. 6 is a block diagram illustrating one embodiment of a computer system architecture that may be employed by the client device or servers disclosed herein.

Referring now to FIG. 6, one embodiment of an exemplary computing architecture 900 which may be implemented at the client device, CRM server, application server etc., to support the processes disclosed herein is provided. In various embodiments, the computing architecture 900 may comprise or be implemented as part of an electronic device that includes greater or fewer of the components shown in FIG. 6. The computing architecture 900 is configured to implement all logic, applications, systems, methods, apparatuses, and functionality described herein.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 6, the computing system 902 comprises a processor 904, a system memory 906 and a system bus 908. The processor 904 can be any of various commercially available computer processors. Dual microprocessors, multi-core processors, and other multi-processor architectures may also be employed as the processor 904.

The system bus 908 provides an interface for system components including, but not limited to, the system memory 906 to the processor 904. The components may be controlled by interfaces, for example disk devices may be controlled according to their various protocols by interfaces 924, 926, and 928. Network communications may be controlled by network adapter 956. The system memory 906 may include various types of computer-readable storage media in the form of one or more higher speed memory units including non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932 including a drive controller program as described with regard to FIG. 6, other program modules 934, and program data 936. For example, the controller program may store program data including the expected plurality of received distal forces associated with a zero-force/working position in a storage device of the processor.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908 but can be connected by other interfaces.

A monitor 944 or other type of display device is also connected to the system bus 908 via an interface, such as a video adaptor 946. The computing system 902 may operate in a networked environment using logical connections via wire and/or wireless communications to one or more remote computers, such as a remote computer 948 including a memory/storage device 950. The logical connections depicted include wire/wireless connectivity to a local area network (LAN) 952 and/or larger networks, for example, a wide area network (WAN) 954. The computing system 902 may also be operable to communicate with wired and wireless devices or entities using the IEEE 802 family of standards. One or more aspects of at least one embodiment may be implemented by representative instructions stored on a machine-readable medium which represents various logic within the processor, which when read by a machine causes the machine to fabricate logic to perform the techniques described herein.

Accordingly, a system and method has been described that utilizes multi-channel communication to increase security and improve confidence in client/call center communications. Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method comprising:
    receiving, at a server, a call trigger and session validation information from a client device, the call trigger to cause a call from a call center to be generated;
    in response to receiving the call trigger, generating the call to the client device and sending, by the server, an authentication request to the client device to authenticate an identity of a user of the client device;
    receiving, at the server, a response from the client device indicating the identity of the user;
    verifying, based on the response, that the user is authorized to receive the call;
    in response to the user being authorized to receive the call, permitting the call to continue; and
    sending the session validation information to the client device.

2. The method of claim 1, wherein the call trigger includes a call request input by the user or an indication, received by the server, that unusual activity has occurred on an account of the user; and
    wherein the session validation information includes a voice clip recorded by the client device or a keyword.

3. The method of claim 1, further comprising indicating to the client device, via textual communication, that a call from the call center is forthcoming, wherein the textual communication indicating to the client that the call from the call center is forthcoming includes sending the textual communication over a trusted communication channel between an application service of the call center and the user.

4. The method of claim 3, wherein the textual communication is provided as a push notification on a mobile device of the user.

5. The method of claim 1, wherein the authentication request includes a request seeking information regarding a password, query response, biometric input, or a combination of these, from the user.

6. The method of claim 5, wherein the biometric input includes one or more of a facial feature, a fingerprint, a hand geometry, an iris scan, a retinal scan, a blood pressure scan, or a voice scan.

7. The method of claim 1, wherein verifying that the user is authorized to receive the call comprises comparing the response from the user against an expected response for the user.

8. An apparatus comprising:
    a memory;
    a user interface; and
    processing circuitry coupled to the memory and the user interface, the processing circuitry to execute instructions stored on the memory, that when executed, cause the processing circuitry to:
    transmit a call trigger and session validation information to a call center, the call trigger to cause a call from the call center to be generated;
    receive the call and an authentication request to authenticate an identity of a user of the apparatus;
    transmit a response to the call center indicating the identity of the user;
    receive the session validation information from the call center for display on the user interface; and
    maintain the call in response to the user being authorized, by the call center, to receive the call.

9. The apparatus of claim 8, wherein the call trigger includes a call request input on the user interface by the user or an indication, received by the call center, that unusual activity has occurred on an account of the user; and
    wherein the session validation information includes a voice clip recorded by the apparatus or a keyword.

10. The apparatus of claim 8, wherein the processing circuitry is further caused to receive textual communication from the call center indicating that a call from the call center is forthcoming; and
    wherein the textual communication indicating that the call from the call center is forthcoming includes receiving the textual communication over a trusted communication channel between an application service of the call center and the user.

11. The apparatus of claim 10, wherein the textual communication is provided as a push notification on the user interface of the apparatus.

12. The apparatus of claim 8, wherein the authentication request includes a request seeking information regarding a password, query response, biometric input, or a combination of information received as input from the user via the user interface of the apparatus.

13. The apparatus of claim 12, wherein the biometric input includes one or more of a facial feature, a fingerprint, a hand geometry, an iris scan, a retinal scan, a blood pressure scan, or a voice scan to be received as the input from the user via the user interface of the apparatus.

14. The apparatus of claim 13, wherein the processing circuit to transmit the response includes the processing circuit to send the input from the user, via the user interface, to the call center.

15. A non-transitory computer-readable storage medium having executable instructions stored thereon, which when executed by a processing circuit of an apparatus, causes the apparatus to:
    receive a call trigger and session validation information from a client device, the call trigger to cause a call from a call center to be generated;
    in response to receiving the call trigger, generate the call to the client device and send an authentication request to the client device to authenticate an identity of a user of the client device;
    receive a response from the client device indicating the identity of the user;
    verify, based on the response, that the user is authorized to receive the call;
    in response to the user being authorized to receive the call, permit the call to continue; and
    send the session validation information to the client device for display thereon.

16. The non-transitory computer-readable storage medium of claim 15, wherein the call trigger includes a call request input by the user, or an indication that unusual activity has occurred on an account of the user; and
    wherein the session validation information includes a voice clip recorded by the client device or a keyword.

17. The non-transitory computer-readable storage medium of claim 15, wherein the apparatus is further caused to indicate to the client device, via textual communication, that a call from the call center is forthcoming; and
    wherein the textual communication indicating to the client that the call from the call center is forthcoming includes the apparatus to send the textual communication over a trusted communication channel between an application service of the call center and the user.

18. The non-transitory computer-readable storage medium of claim 17, wherein the textual communication is provided as a push notification on a mobile device of the user.

19. The non-transitory computer-readable storage medium of claim 15, wherein the authentication request includes a request seeking information regarding a password, query response, biometric input, or a combination of these, from the user; and wherein the biometric input includes one or more of a facial feature, a fingerprint, a hand geometry, an iris scan, a retinal scan, a blood pressure scan, or a voice scan.

20. The non-transitory computer-readable storage medium of claim 15, wherein the processing circuit to verify that the user is authorized to receive the call includes the processing circuit to compare the response from the user against an expected response for the user.

\* \* \* \* \*